United States Patent
Mun

(10) Patent No.: US 10,471,434 B2
(45) Date of Patent: Nov. 12, 2019

(54) THREE-STAGE MILLSTONES

(71) Applicant: In-Sul Mun, Seoul (KR)

(72) Inventor: In-Sul Mun, Seoul (KR)

( * ) Notice: Subject to any disclaimer, the term of this patent is extended or adjusted under 35 U.S.C. 154(b) by 252 days.

(21) Appl. No.: 15/534,015

(22) PCT Filed: Apr. 6, 2016

(86) PCT No.: PCT/KR2016/003614
§ 371 (c)(1),
(2) Date: Jun. 8, 2017

(87) PCT Pub. No.: WO2016/163760
PCT Pub. Date: Oct. 13, 2016

(65) Prior Publication Data
US 2018/0333726 A1    Nov. 22, 2018

(30) Foreign Application Priority Data

Apr. 6, 2015  (KR) ......................... 10-2015-0048666

(51) Int. Cl.
*B02C 7/00* (2006.01)
*B02C 7/02* (2006.01)
(Continued)

(52) U.S. Cl.
CPC .................. *B02C 7/02* (2013.01); *B02C 7/12* (2013.01); *B02C 7/13* (2013.01)

(58) Field of Classification Search
CPC .... B02C 7/02; B02C 7/08; B02C 7/12; B02C 7/13; A47J 43/07; A47J 43/04; D21D 1/30; D21D 1/303; D21D 1/306
See application file for complete search history.

(56) References Cited

U.S. PATENT DOCUMENTS 3,926,380 A * 12/1975 Musgrove ................. B02C 7/08
241/248
3,952,958 A *  4/1976 Rich ........................ B02C 2/10
241/162

(Continued)

FOREIGN PATENT DOCUMENTS

JP    2007-185611 A     7/2007
JP    2007-313452 A    12/2007
(Continued)

OTHER PUBLICATIONS

International Search Report for International Application No. PCT/KR2016/003614 dated Aug. 8, 2016.

*Primary Examiner* — Faye Francis
(74) *Attorney, Agent, or Firm* — Clements Bernard Walker; Christopher L. Bernard

(57) ABSTRACT

Disclosed is a three-stage millstone including an upper stone having a grain inlet and an inlet path, a middle stone disposed under the upper stone for causing grain, introduced through the inlet path, to move to an edge thereof and grinding the grain using compressive force between the upper and middle stones, a lower stone disposed under the middle stone for secondarily grinding the grain using compressive force between the middle and lower stones, the upper surface of the lower stone being wider than the lower surface of the middle stone and being inclined downward to allow the ground grain to inwardly move from the edge of the middle stone to the center of the lower stone, the lower stone having a grain outlet passage, a rotation device for enabling rotation of the middle stone, other than the upper and lower stones, and an actuator for rotating the middle stone.

9 Claims, 10 Drawing Sheets

(51) Int. Cl.
   *B02C 7/13*   (2006.01)
   *B02C 7/12*   (2006.01)

(56) References Cited

U.S. PATENT DOCUMENTS

| | | | | | |
|---|---|---|---|---|---|
| 3,997,120 | A | * | 12/1976 | Zimmer | A47J 42/06 241/56 |
| 4,022,388 | A | * | 5/1977 | Schnitzer | B02C 7/08 241/246 |
| 4,034,921 | A | * | 7/1977 | Schnitzer | B02C 7/02 241/157 |
| 4,502,643 | A | * | 3/1985 | Burggrabe | B02C 7/13 241/257.1 |
| 5,564,636 | A | * | 10/1996 | Mock | A47J 42/16 241/261.2 |

FOREIGN PATENT DOCUMENTS

| | | |
|---|---|---|
| KR | 20-0199255 Y1 | 11/2000 |
| KR | 2003-0025356 A | 3/2003 |
| KR | 1020070101936 A | 10/2007 |

* cited by examiner

[FIG 1] [PRIOR ART]
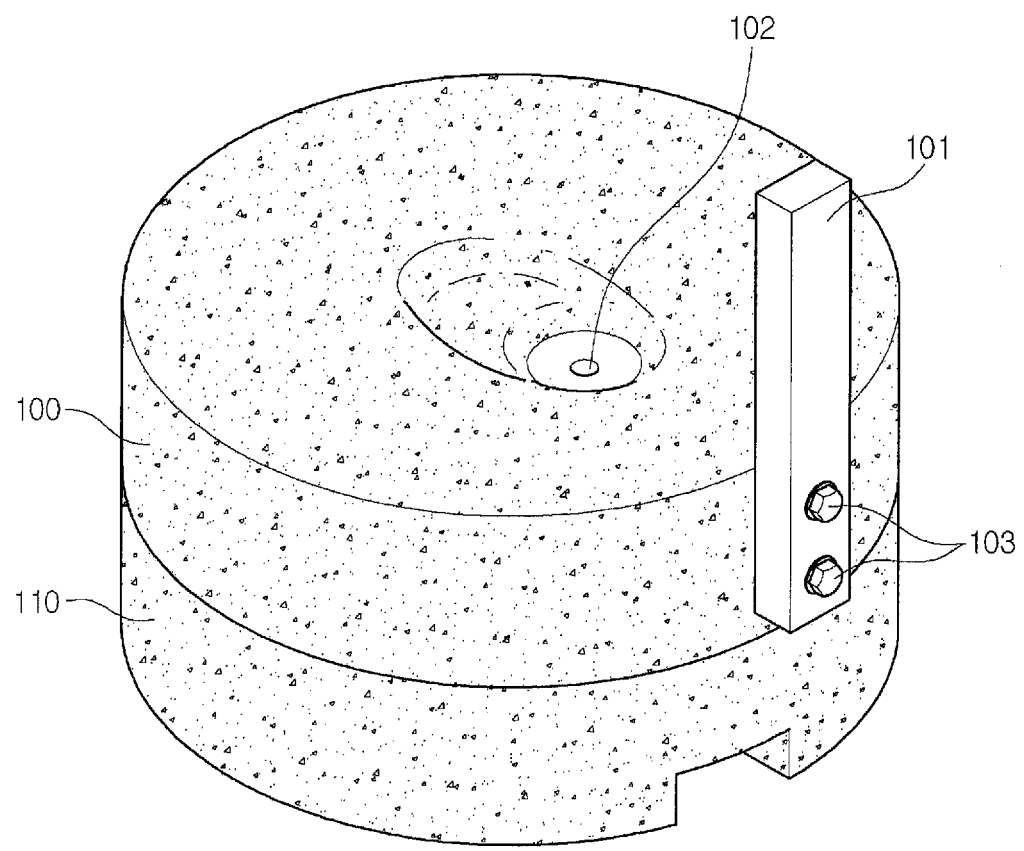

[FIG 2]
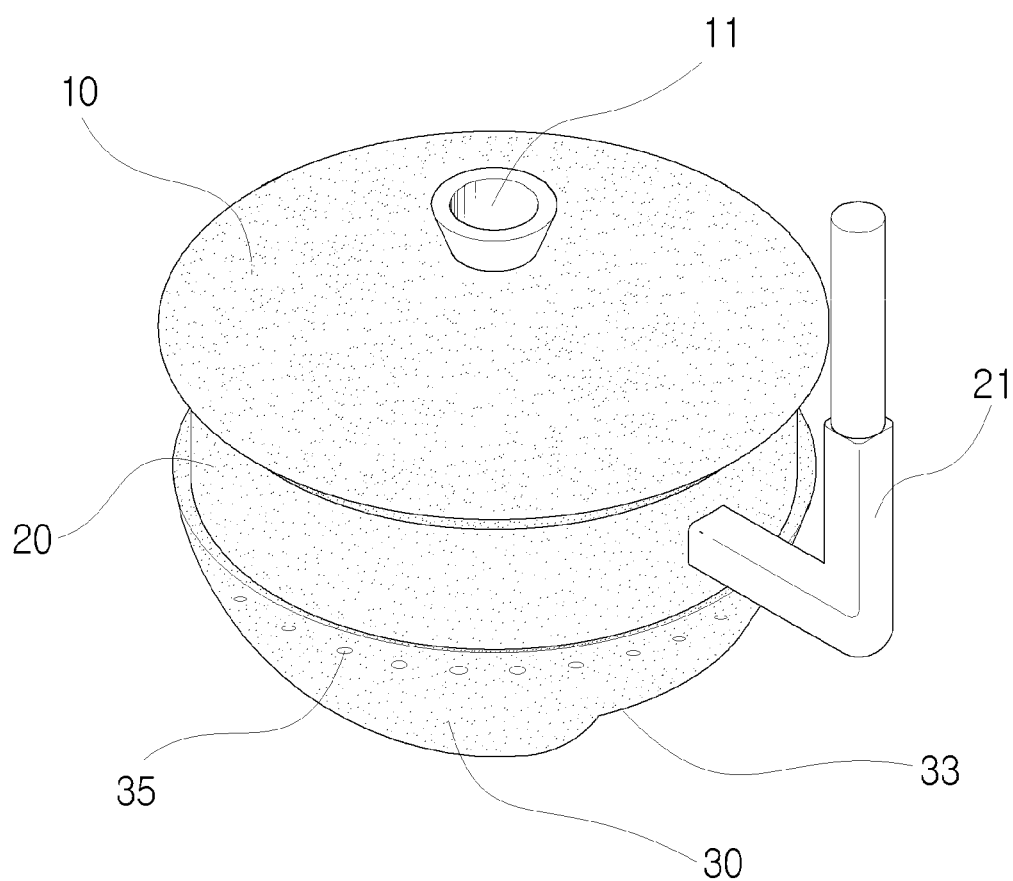

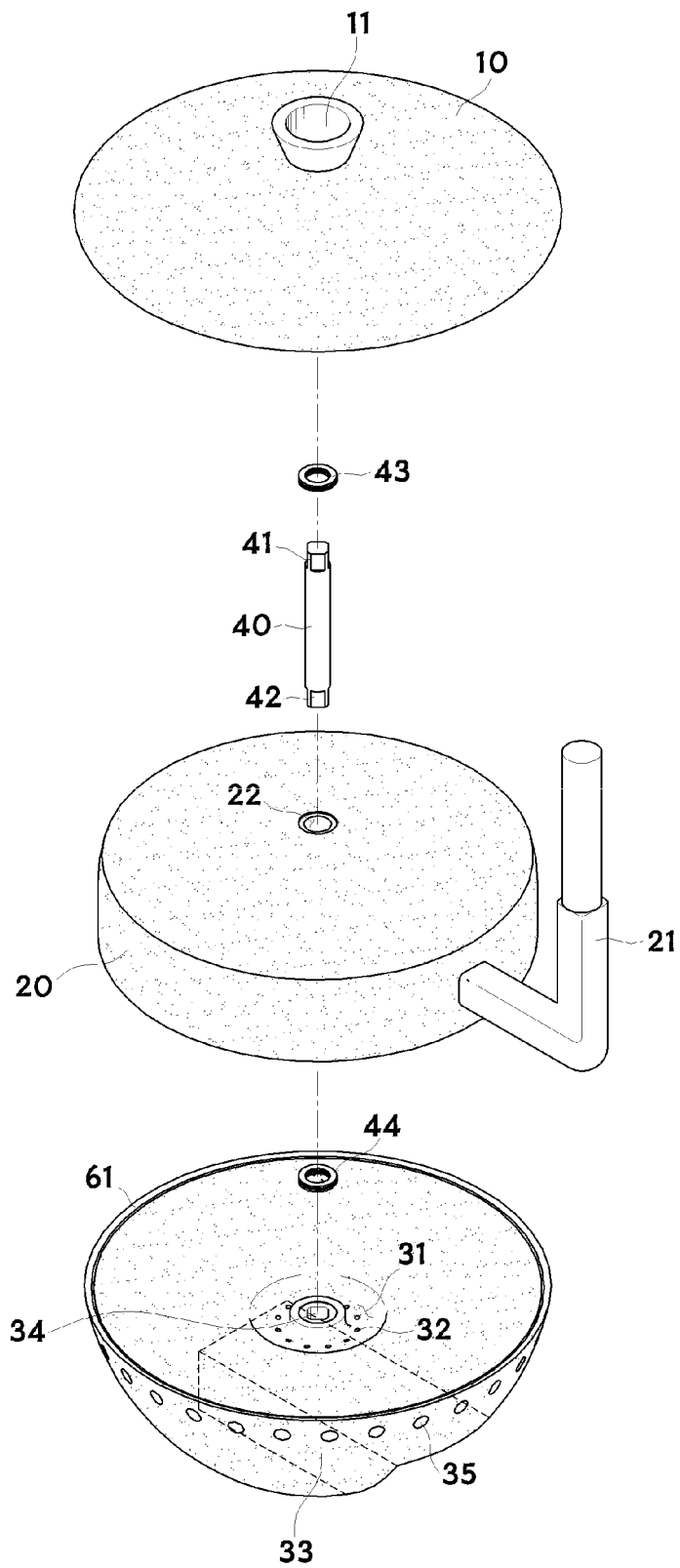
[FIG 3]

[FIG 4]
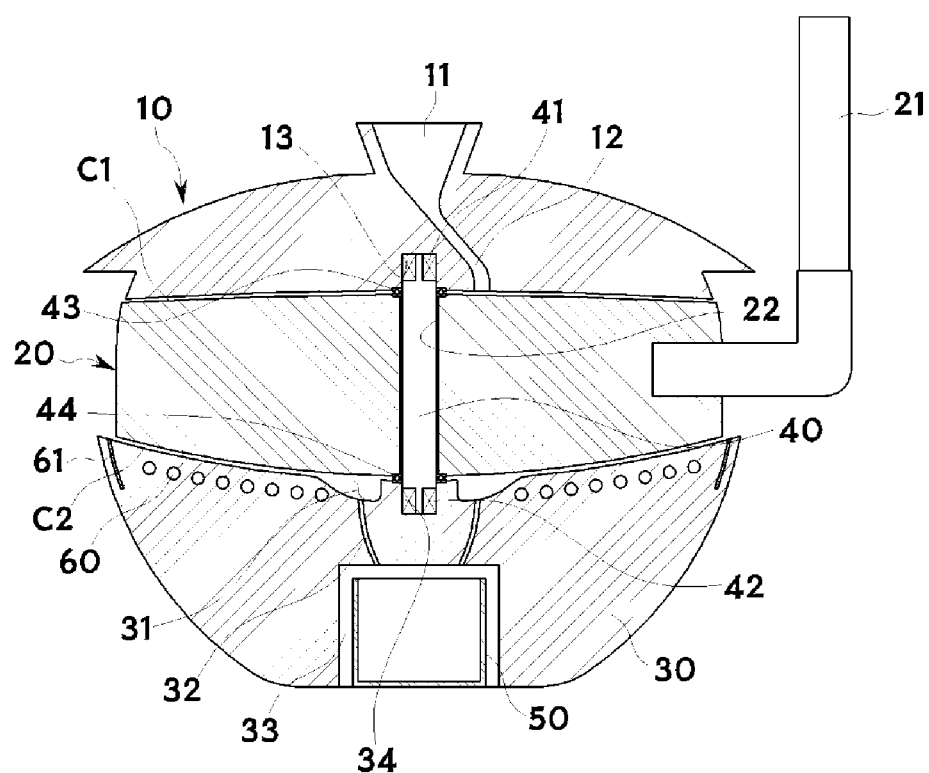

[FIG 5]
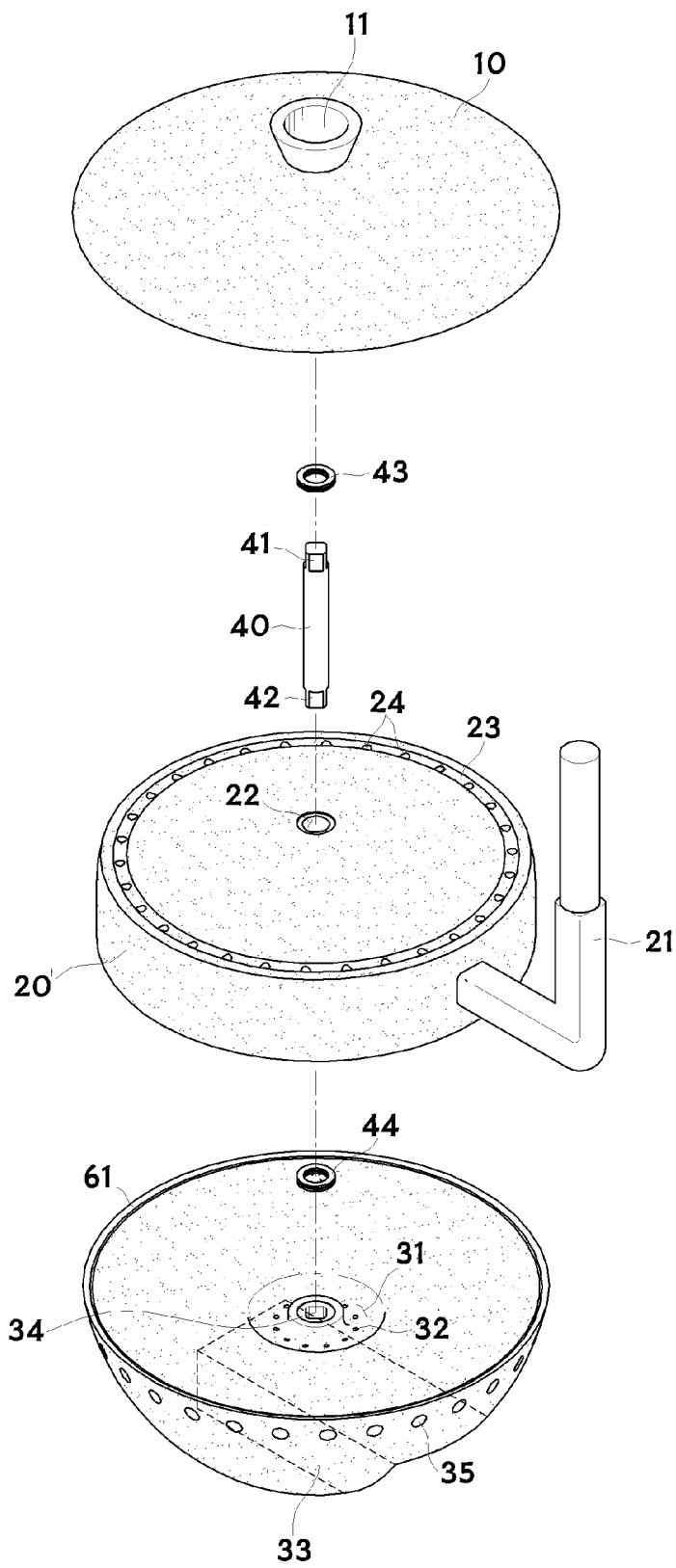

[FIG 6]
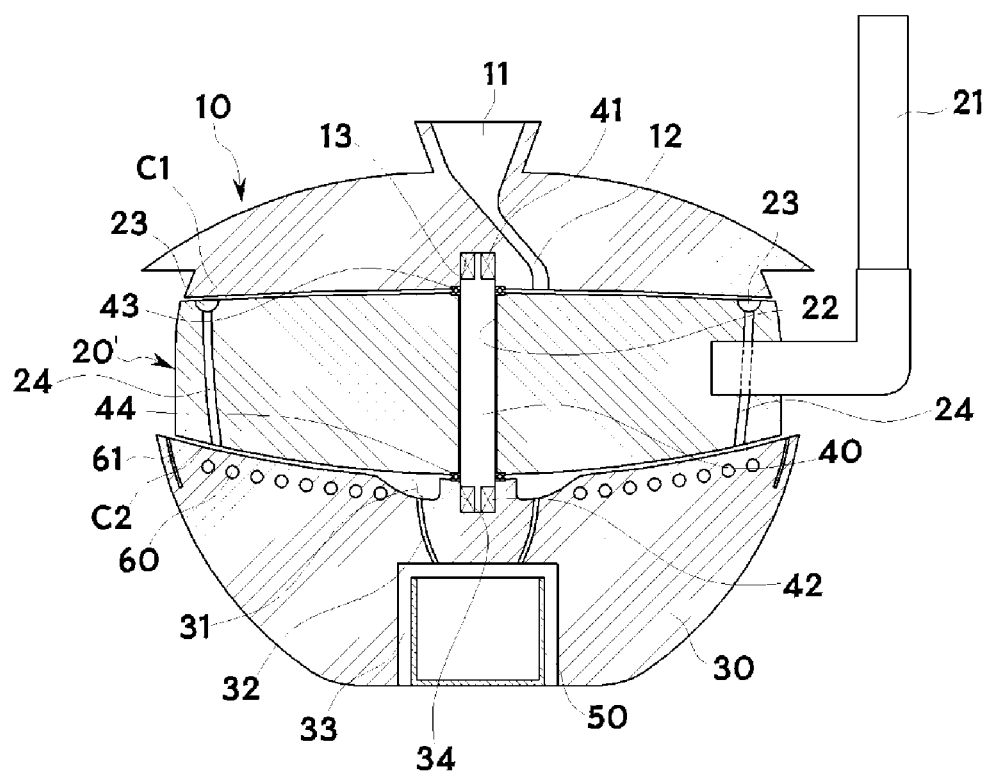

[FIG 7]
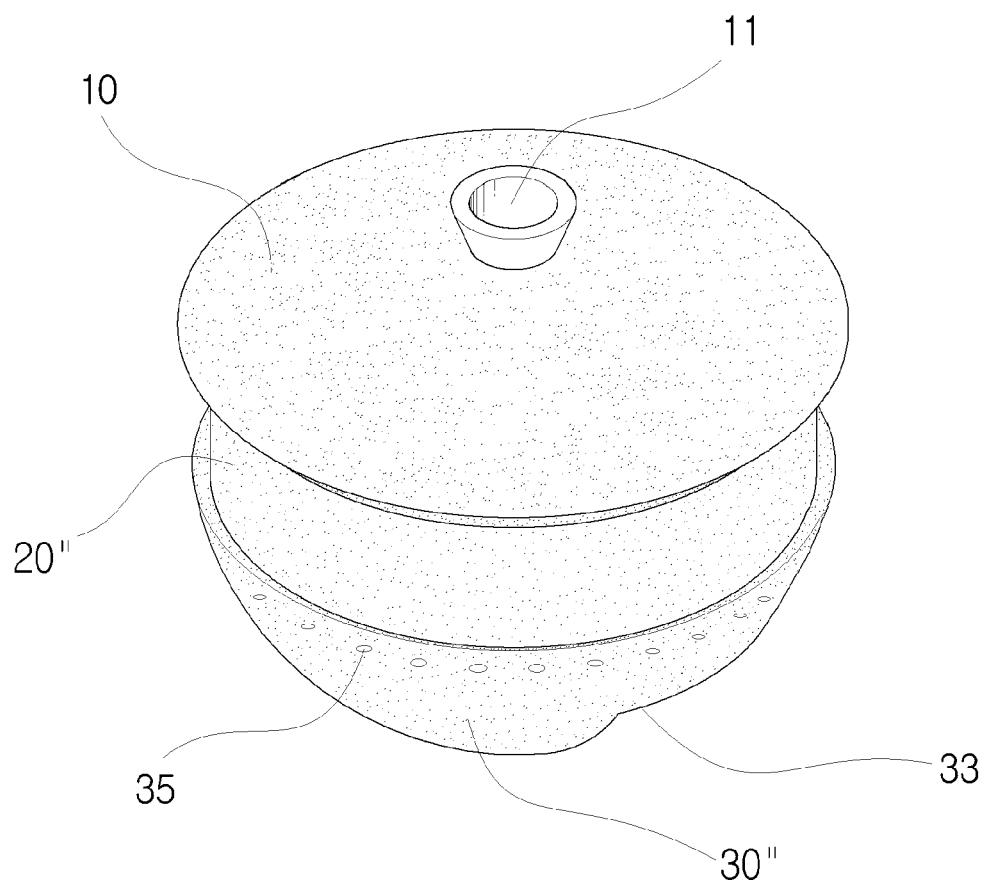

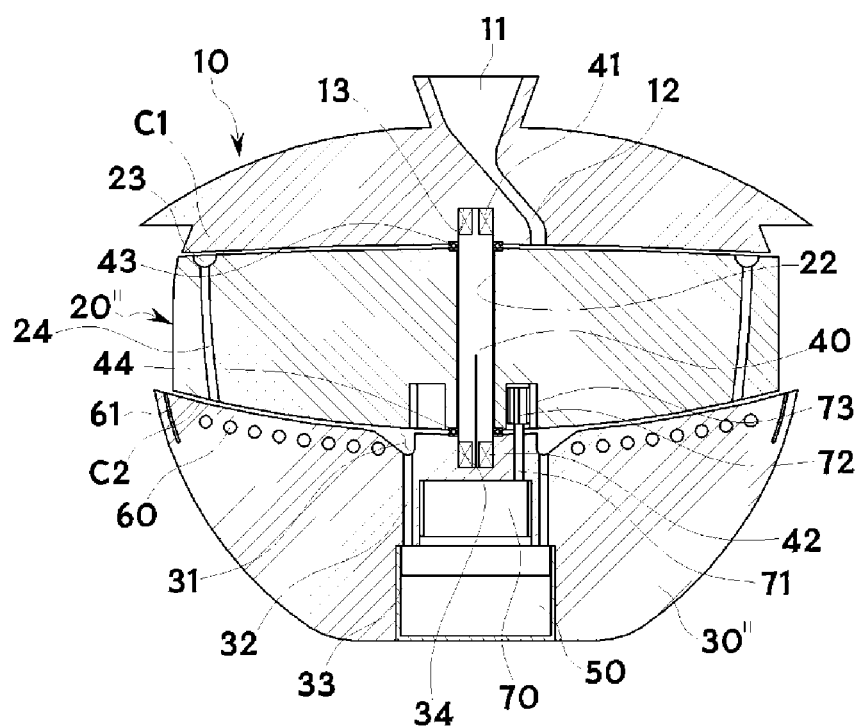
[FIG 8]

[FIG 9]
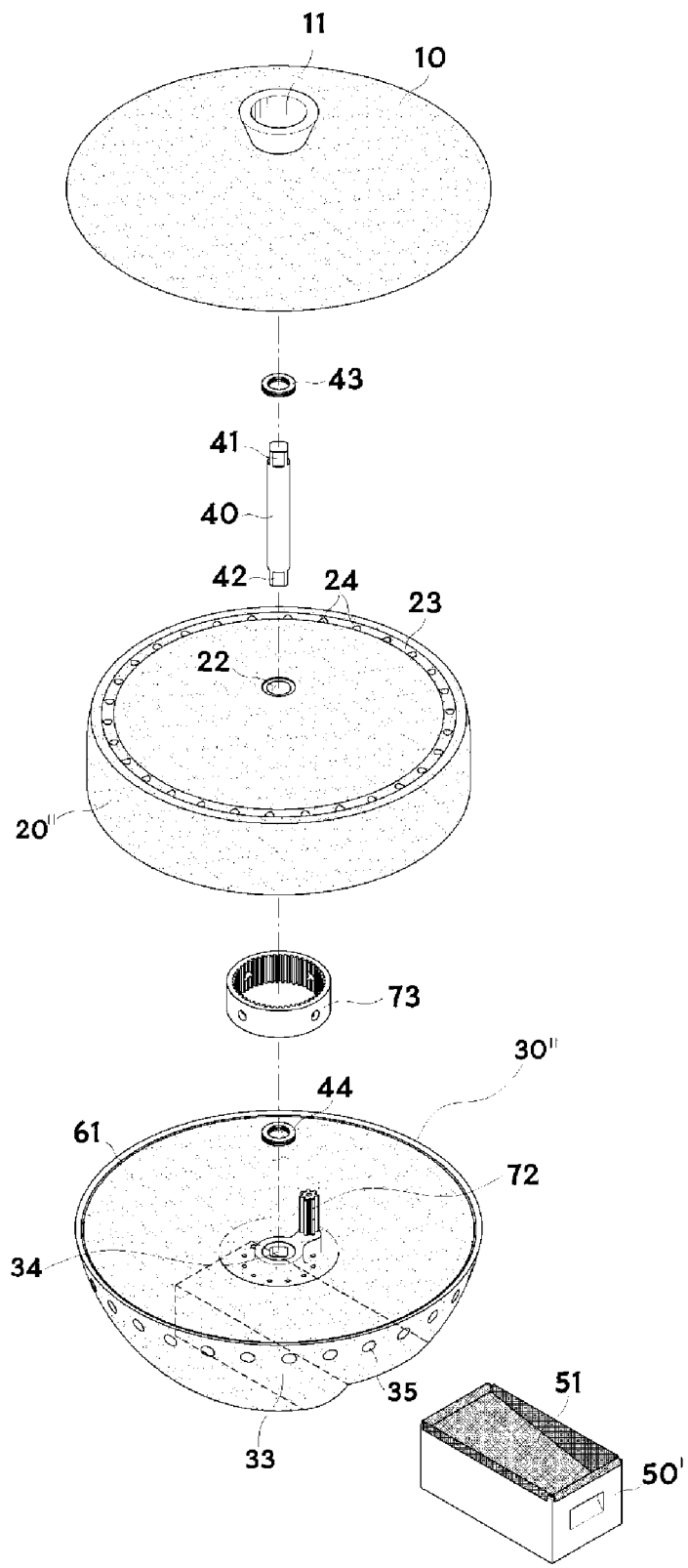

[FIG 10]
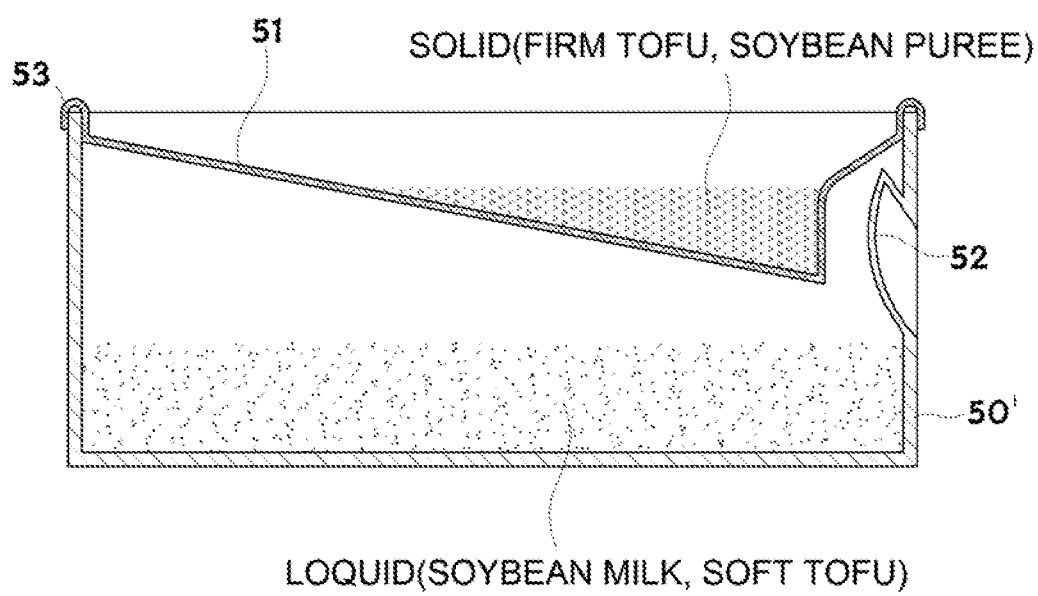

THREE-STAGE MILLSTONES

BACKGROUND OF THE INVENTION

Field of the Invention

The present invention relates to a millstone that is used to grind grains in a traditional manner, and more particularly to a three-stage millstone, which is configured in three stages including an upper stone, a middle stone, and a lower stone so as to grind grains twice between the upper stone and the middle stone and between the middle stone and the lower stone, thereby realizing finer grinding, and thus ensuring better-tasting food made using ground grains, which creates a traditional atmosphere attributable to the revealed external millstone shape, and which causes ground grains to be discharged from the center portion of the lower stone, thereby facilitating easy processing of the ground grains.

Description of the Related Art

A millstone is a traditional home pulverizer that has been used for a very long time to grind grains, such as, for example, beans or mung beans, using the compressive force between two cylindrical stones. Such a traditional millstone, as illustrated in FIG. 1, includes an upper stone 100, a lower stone 110, and a handle 101 for rotating the upper stone 100. An inlet 102 for introducing grains to be ground is formed in the upper stone 100 so as to vertically penetrate the upper stone 100. The periphery of the inlet 102 is concavely formed to allow grains to flow well into the inlet 102. The handle 101 is formed on the lateral side of the upper stone 100. The illustrated example shows the state in which the handle 101 is fixed using bolts 103. In this case, female screws (not illustrated) are embedded in advance in corresponding portions of the upper stone 100. Of course, the installation structure of the handle 101 may be altered to other forms.

Contact surfaces of the upper stone 100 and the lower stone 110 are slightly inclined from the center to the periphery, like an umbrella. A pivot (not illustrated) is formed on the center of the upper surface of the lower stone 110, and is inserted into an insertion hole (not illustrated), which is formed in the center of the lower surface of the upper stone 100.

The upper stone 100 and the lower stone 110 may be formed of a material that intrinsically has a lot of pores, such as basalt, because the contact surfaces thereof need to be rough in order to grind grains well. In addition to basalt, for example, granite or quartz porphyry may be used.

To use a conventional millstone, a user continuously turns the upper stone 100 using the handle 101 while gradually introducing soaked grains and water into the inlet 102 in the upper stone 100. In this case, the swollen grains are ground on the contact surfaces of the upper stone 100 and the lower stone 110 using compressive force and frictional force. The grinding is continued while the ground grains move in a radial direction until they reach the peripheral edge of the millstone. Thereby, the ground grains are discharged outward through a gap between the upper stone 100 and the lower stone 110 and are stored in a storage container thereunder.

Examples of food made using grains ground in the manner described above may include soybean puree, soft tofu, and mung bean pancakes.

The above-described conventional millstone, however, does not grind grains very finely, and thus has difficulty in providing flavorful food made using ground grains because the grains are ground using the compressive force and frictional force only on the contact surfaces of the upper stone 100 and the lower stone 110.

In addition, because the conventional millstone causes the ground grains to be discharged from the edge of the millstone, the millstone needs to be placed in a large container, or a device for collecting the ground grains needs to be additionally installed.

SUMMARY OF THE INVENTION

Therefore, the present invention has been made in view of the above problems, and it is one object of the present invention to provide a three-stage millstone, which is configured to grind grains twice, thereby realizing finer grinding, and thus ensuring more flavorful grains, and which creates a traditional atmosphere attributable to the revealed external millstone shape.

It is another object of the present invention to provide a three-stage millstone, which allows ground grains to be discharged from the center portion thereof, thereby realizing easy collection of the ground grains and facilitating easy post-treatment thereof.

In accordance with the present invention, the above and other objects can be accomplished by the provision of a three-stage millstone for grinding grain using compressive force between stones, the millstone including an upper stone having a grain inlet formed in a center portion thereof, into which grain to be ground is introduced, and an inlet path, along which the introduced grain moves to a lower surface of the upper stone, a middle stone disposed under the upper stone for causing the grain, which is introduced to a center portion of an upper surface thereof through the inlet path in the upper stone, to move to an edge thereof, the middle stone primarily grinding the grain using compressive force between the upper stone and the middle stone, a lower stone disposed under the middle stone for secondarily grinding the grain using compressive force between the middle stone and the lower stone, wherein the lower stone has an upper surface, a diameter of which is greater than a diameter of a lower surface of the middle stone, wherein the upper surface of the lower stone, an edge portion of which protrudes outward from the middle stone, is inclined downward to allow the ground grain, introduced from an edge of the middle stone, to move inward to a center portion of the lower stone, and wherein the lower stone is provided with an outlet passage for discharging the ground grain, a middle stone rotation device for enabling rotation of the middle stone and preventing rotation of the upper stone and the lower stone, and an actuator for rotating the middle stone.

The middle stone rotation device may include a vertical through-hole formed in a center of the middle stone, and a center shaft for penetrating the vertical through-hole, the center shaft having an upper end coupled to the upper stone and a lower end coupled to the lower stone.

The actuator may be a handle fixed to a side surface of the middle stone.

The actuator may include a ring gear installed in an annular groove, which is formed in the lower surface of the middle stone, a drive motor installed in the lower stone so that a motor shaft thereof penetrates and protrudes upward from the lower stone, and a pinion gear coupled to a tip end of the motor shaft so as to be engaged with the ring gear in the middle stone.

The upper stone and the middle stone may define a clearance therebetween, which is upwardly convex to allow the grain to be ground to move from a center portion to an edge of the clearance, and the middle stone and the lower stone may define a clearance therebetween, which is downwardly concave to allow the grain to move from an edge to a center portion of the clearance.

The outlet passage of the lower stone may include an annular furrow formed in a center portion of the upper surface of the lower stone and a plurality of outlet paths extending downward from the furrow, and the lower stone may include a hollowed portion formed below the outlet paths so as to communicate with an outside.

The middle stone may include an annular furrow formed in an edge portion of the upper surface thereof, and a plurality of movement paths extending from the furrow to the lower surface thereof.

The lower stone may include a heater wire embedded therein, and an insulator embedded in a peripheral edge thereof in order to prevent heat generated by the heater wire embedded therein from being transferred outward.

The three-stage millstone may further include a storage container configured to be inserted into the hollowed portion of the lower stone and to receive the ground grain discharged from the outlet paths so as to separate a liquid from a solid.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a conventional millstone;

FIG. 2 is a perspective view illustrating a three-stage millstone according to one embodiment of the present invention;

FIG. 3 is an exploded perspective view illustrating the three-stage millstone of the embodiment illustrated in FIG. 2;

FIG. 4 is a cross-sectional view illustrating the three-stage millstone of the embodiment illustrated in FIG. 2;

FIG. 5 is an exploded perspective view illustrating a three-stage millstone according to another embodiment of the present invention;

FIG. 6 is a cross-sectional view illustrating the three-stage millstone of the embodiment illustrated in FIG. 5;

FIG. 7 is a perspective view illustrating a three-stage millstone according to a further embodiment of the present invention;

FIG. 8 is a cross-sectional view illustrating the three-stage millstone of the embodiment illustrated in FIG. 7;

FIG. 9 is an exploded perspective view illustrating the three-stage millstone of the embodiment illustrated in FIG. 7; and FIG. 10 is a cross-sectional view illustrating a storage container that is usable with the three-stage millstone of the embodiment illustrated in FIG. 7.

DETAILED DESCRIPTION OF THE INVENTION

Reference will now be made in detail to the embodiments of the present invention, examples of which are illustrated in the accompanying drawings.

A three-stage millstone of one embodiment of the present invention is a millstone that grinds grain using the compressive force between stones, in the same manner as a conventional millstone. As illustrated in FIGS. 2 to 4, the three-stage millstone includes an upper stone 10, a middle stone 20, a lower stone 30, and a center shaft 40, and generally has an iron pot shape to allow a user to get the old atmosphere while grinding grain.

The upper stone 10 is provided in the center portion thereof with a grain inlet 11, into which grains to be ground are introduced, and an inlet path 12, along which the introduced grain moves to the lower surface of the upper stone 10. The grain inlet 11 is formed in the center, and the lower end of the inlet path 12 slightly deviates from the center shaft 40 so as to move the introduced grain outward.

The middle stone 20 is disposed under the upper stone 10, and is configured to move the grain, which is introduced into the center portion of the upper surface thereof through the inlet path 12 of the upper stone 10, to the edge thereof and to primarily grind the grain using the compressive force between the upper stone 10 and the middle stone 20. The middle stone 20 is centrally provided with a vertical through-hole 22, and a handle 21 is coupled to the side surface of the middle stone 20.

The lower stone 30 is disposed under the middle stone 20, and is configured to move the ground grain, introduced from the edge of the middle stone 20, to the center portion thereof and to secondarily grind the grain using the compressive force between the middle stone 20 and the lower stone 30. In order to discharge the ground grain, the lower stone 30 includes an annular furrow 31 formed in the center portion of the upper surface thereof, and outlet paths 32 extending downward from the annular furrow 31.

As illustrated in FIG. 4, the diameter of the upper surface of the lower stone 30 is greater than the diameter of the lower surface of the middle stone 20, and the upper surface of the lower stone 30, the edge of which protrudes outward from the middle stone 20, is inclined downward so as to inwardly move the grain.

The center shaft 40 penetrates the vertical through-hole 22 in the middle stone 20, and has an upper end 41 coupled to the upper stone 10 and a lower end 42 coupled to the lower stone 30 so as to prevent rotation of the upper stone 10 and the lower stone 30 while allowing rotation of the middle stone 20. To this end, the upper end 41 and the lower end 42 of the center shaft 40 have an angled cross section, such as a rectangle. In addition, a shaft fixing recess 13 formed in the lower surface of the upper stone 10 and a shaft fixing recess 34 formed in the upper surface of the lower stone 30 have an angled cross section, such as a rectangle, in order to prevent relative rotation between the upper stone 10 and the center shaft 40 and between the lower stone 30 and the center shaft 40. In addition, the portion of the center shaft 40 that is inserted into the middle stone 20 has a circular cross section, and is spaced apart from the vertical through-hole 22 in the middle stone 20 to enable rotation of the middle stone 20.

As illustrated, a clearance C1 between the upper stone 10 and the middle stone 20 is upwardly convex to allow grain to be ground to move from the center portion to the edge, and a clearance C2 between the middle stone 20 and the lower stone 30 is downwardly concave to allow the grain to move from the edge to the center portion. The clearances C1 and C2 may be as fine as possible because they simply serve to prevent shocks from being applied to the stones above and below thereof.

The lower stone 30 has a hollowed portion 33, which is formed in the center of the lower portion thereof so as to be exposed outward. The outlet paths 32 of the lower stone 30 are in communication with the hollowed portion 33. In the hollowed portion 33, a storage container 50 is placed to store ground grain discharged from the outlet paths 32. However, the outlet paths 32 may be configured so as to extend to the side surface or the lower surface of the lower stone 30 so that the ground grain is discharged to the outside of the lower stone 30, or may be connected to a hose so that the ground grain is directed to the hose.

In addition, thrust bearings 43 and 44 are respectively installed on the center shaft 40 between the upper stone 10 and the middle stone 20 and between the middle stone 20 and the lower stone 30. This may ensure smooth rotation of the middle stone 20, and may prevent stone powder from being generated by abrasion between the upper stone 10 and the middle stone 20 and between the middle stone 20 and the lower stone 30.

In addition, in order to allow the ground grain, which moves in the clearance between the middle stone 20 and the lower stone 30, to be heated during grinding and movement, heater wires 60 are embedded near the upper surface of the lower stone 30. A plurality of heater holes 35 may be formed in the side surface of the lower stone 30 so that the heater wires 60 are inserted into the respective heater holes 35. In addition, in order to prevent the heat generated by the heater wires 60 from being transferred to the side surface, an insulator 61 is embedded in the peripheral edge of the lower stone 30.

FIGS. 5 and 6 illustrate another embodiment of the present invention. As illustrated, the present embodiment is substantially the same as the above-described embodiment, except that a middle stone 20' includes an annular furrow 23 formed in the edge portion of the upper surface thereof, and a plurality of movement paths 24 extending from the furrow 23 to the lower surface thereof.

As illustrated in FIGS. 7 to 10, a three-stage millstone according to a further embodiment of the present invention includes the upper stone 10, a middle stone 20", a lower stone 30", a middle stone rotation device, and a power device.

The three-stage millstone of the present embodiment differs from the above-described embodiments in that the middle stone 20" is rotated by power. That is, the power device is used as an actuator to rotate the middle stone 20".

The power device includes a ring gear 73 installed in an annular groove formed in the lower surface of the middle stone 20", a drive motor 70 installed in the lower stone 30" so that a motor shaft 71 thereof penetrates and protrudes upward from the lower stone 30", and a pinion gear 72 coupled to the tip end of the motor shaft 71 so as to be engaged with the ring gear 73 in the middle stone 20". The ring gear 73 is fixed to the middle stone 20" via bolts. To this end, nuts are embedded in advance in corresponding portions of the middle stone 20".

A storage container 50' may be inserted into the hollowed portion 33, which is formed in the center of the lower portion of the lower stone 30". The storage container 50' is configured to receive the ground grain discharged from the outlet paths 32 and to separate liquids from solids. To this end, as illustrated in FIGS. 9 and 10, for example, a filtering net 51 is installed in the storage container 50' so that liquids contained in the ground grain flow downward through the filtering net 51 and solids remain on the filtering net 51.

The storage container 50' may be provided with a handle 52 to assist the user in conveniently inserting or removing the storage container 50' into or from the hollowed portion 33, and the filtering net 51 may be provided on the edge thereof with a holder 53, which is caught by the upper end of the sidewall of the storage container 50' in order to ensure easy separation and installation of the filtering net 51.

The three-stage millstone of the present invention, configured as described above, operates as follows.

After grain to be ground, such as, for example, beans or mung beans, is soaked in water so as to be swollen, the grain and a small amount of water are gradually introduced into the grain inlet 11 in the upper stone 10. Meanwhile, the middle stone 20, 20' or 20" is rotated. In the case of the middle stones 20 and 20' in the embodiments of FIGS. 3 and 5, the handle 21 serves as an actuator to rotate the middle stone, whereas, in the case of the middle stone 20" in the embodiment of FIG. 7, the drive motor 70 serves as an actuator to rotate the middle stone. At this time, the upper stone 10 and the lower stone 30 or 30" are connected to each other via the center shaft 40, and thus are not rotated.

Moreover, because the upper end 41 and the lower end 42 of the center shaft 40 are angled and the shaft fixing recess 13 of the upper stone 10 and the shaft fixing recess 34 of the lower stone 30 are angled to allow the upper end 41 and the lower end 42 of the center shaft 40 to be fitted thereinto, relative rotation between the upper stone 10 and the lower stone 30 or 30" is impossible. In addition, because the center shaft 40 is not rotated, whereas the middle portion of the center shaft 40 has a cylindrical shape and the vertical through-hole 22 in the middle stone 20, 20' or 20" has a cylindrical shape, the middle stone 20, 20' or 20" is rotated about the center shaft 40.

The grain introduced into the grain inlet 11 moves along the inlet path 12 to the clearance C1 between the upper stone 10 and the middle stone 20, 20' or 20", and is then gradually ground while moving from the center portion to the edge portion of the clearance C1.

In the embodiment of FIG. 2, the primarily ground grain moves downward along the outer side surface of the middle stone 20, and after reaching the edge portion of the lower stone 30, move into the clearance C2 between the middle stone 20 and the lower stone 30.

In the embodiments of FIGS. 5 and 7, the primarily ground grain is gathered in the furrow 23, which is formed in the edge portion of the middle stone 20' or 20", and subsequently move downward along the movement paths 24, thereby moving into the clearance C2 between the middle stone 20' or 20" and the lower stone 30 or 30".

The primarily ground grain is secondarily ground while moving from the edge portion to the center portion of the clearance C2 between the middle stone 20, 20' or 20" and the lower stone 30 or 30", and are then gathered in the furrow 31 formed in the center portion, and subsequently move downward through the outlet paths 32.

As described above, because the three-stage millstone of the present invention is configured to grind grain twice between the upper stone 10 and the middle stone 20, 20' or 20" and between the middle stone 20, 20' or 20" and the lower stone 30 or 30", finer grinding is possible, and thus, more flavorful grain may be provided. In addition, because the upper stone 10, the middle stone 20, 20' or 20", and the lower stone 30 or 30" are fixed to one another via the center shaft 40 therein, the entire three-stage millstone may exhibit an iron pot shape.

In addition, because the ground grain is discharged from the center portion of the lower stone, the ground grain may be easily collected and stored, which may also facilitate any post-treatment of the ground grain.

Meanwhile, because the ground grain may be discharged in a cooked state in the case where the heater wires 60 are embedded in the lower stone as illustrated, the resulting liquid, such as soybean milk, in the storage container 50 or 50', may be directly drinkable, and may be processed into, for example, soft tofu, firm tofu or soybean puree.

The embodiment of FIG. 7 also ensures very convenient use because the drive motor 70 is used as an actuator to rotate the middle stone 20".

As is apparent from the above description, a three-stage millstone according to the present invention may grind grain twice, thereby ensuring finer grinding and more flavorful grain. In addition, because an upper stone and a lower stone are connected to each other via a center shaft therein, the millstone may reveal the original external appearance thereof, creating a traditional atmosphere.

In addition, the three-stage millstone may enable easy gathering of the ground grain, and thus may facilitate easy post-treatment because it is configured to discharge ground grain from the center portion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A three-stage millstone for grinding grain using compressive force between stones, the millstone comprising:
    an upper stone having a grain inlet formed in a center portion thereof, into which grain to be ground is introduced, and an inlet path, along which the introduced grain moves to a lower surface of the upper stone;
    a middle stone disposed under the upper stone for causing the grain, which is introduced to a center portion of an upper surface thereof through the inlet path in the upper stone, to move to an edge thereof, the middle stone primarily grinding the grain using compressive force between the upper stone and the middle stone;
    a lower stone disposed under the middle stone for secondarily grinding the grain using compressive force between the middle stone and the lower stone, wherein the lower stone has an upper surface, a diameter of which is greater than a diameter of a lower surface of the middle stone, wherein the upper surface of the lower stone, an edge portion of which protrudes outward from the middle stone, is inclined downward to allow the ground grain, introduced from an edge of the middle stone, to move inward to a center portion of the lower stone, and wherein the lower stone is provided with an outlet passage for discharging the ground grain;
    a middle stone rotation device for enabling rotation of the middle stone and preventing rotation of the upper stone and the lower stone; and
    an actuator for rotating the middle stone.

2. The three-stage millstone according to claim 1, wherein the middle stone rotation device includes:
    a vertical through-hole formed in a center of the middle stone; and
    a center shaft for penetrating the vertical through-hole, the center shaft having an upper end coupled to the upper stone and a lower end coupled to the lower stone.

3. The three-stage millstone according to claim 1, wherein the actuator is a handle fixed to a side surface of the middle stone.

4. The three-stage millstone according to claim 1, wherein the actuator includes:
    a ring gear installed in an annular groove, which is formed in the lower surface of the middle stone;
    a drive motor installed in the lower stone so that a motor shaft thereof penetrates and protrudes upward from the lower stone; and
    a pinion gear coupled to a tip end of the motor shaft so as to be engaged with the ring gear in the middle stone.

5. The three-stage millstone according to claim 1, wherein the upper stone and the middle stone define a clearance therebetween, which is upwardly convex to allow the grain to be ground to move from a center portion to an edge of the clearance, and
    wherein the middle stone and the lower stone define a clearance therebetween, which is downwardly concave to allow the grain to move from an edge to a center portion of the clearance.

6. The three-stage millstone according to claim 1, wherein the outlet passage of the lower stone includes an annular furrow formed in a center portion of the upper surface of the lower stone and a plurality of outlet paths extending downward from the furrow, and
    wherein the lower stone includes a hollowed portion formed below the outlet paths so as to communicate with an outside.

7. The three-stage millstone according to claim 1, wherein the middle stone includes an annular furrow formed in an edge portion of the upper surface thereof, and a plurality of movement paths extending from the furrow to the lower surface thereof.

8. The three-stage millstone according to claim 1, wherein the lower stone includes:
    a heater wire embedded therein; and
    an insulator embedded in a peripheral edge thereof in order to prevent heat generated by the heater wire embedded therein from being transferred outward.

9. The three-stage millstone according to claim 6, further comprising a storage container configured to be inserted into the hollowed portion of the lower stone and to receive the ground grain discharged from the outlet paths so as to separate a liquid from a solid.

* * * * *